(No Model.) 2 Sheets—Sheet 1.
O. B. GRANT.
AUTOMATIC HOSE COUPLER.
No. 391,789. Patented Oct. 30, 1888.
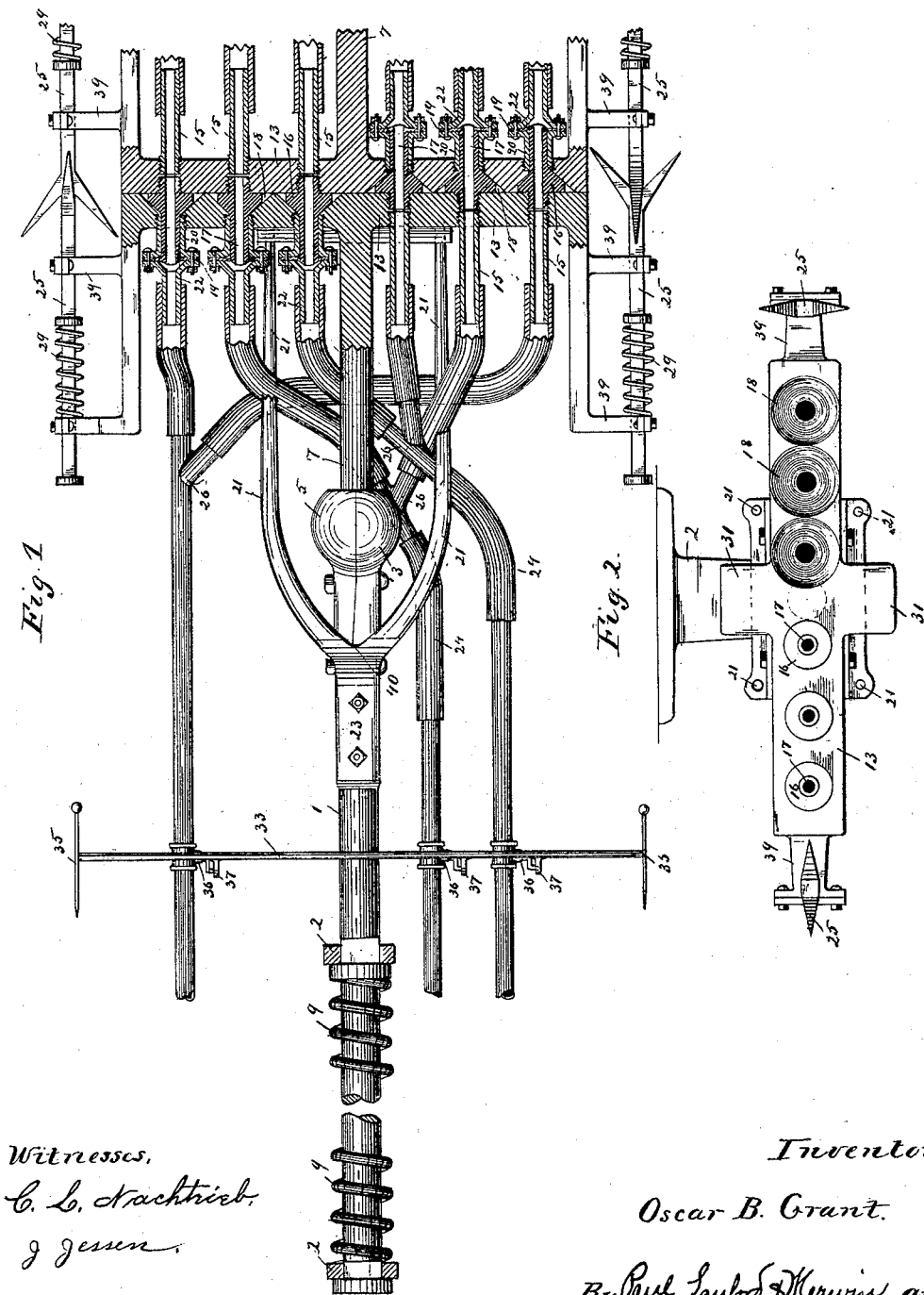
Witnesses,
C. L. Nachtrieb,
J. Jessen
Inventor,
Oscar B. Grant.
By Paul, Sanford & Kerwin, Attys.

(No Model.) 2 Sheets—Sheet 2.

O. B. GRANT.
AUTOMATIC HOSE COUPLER.

No. 391,789. Patented Oct. 30, 1888.

Witnesses.
C. C. Nachtrieb.
J. Jessen.

Inventor
Oscar B Grant.
By Paul Sanford D Merwin, attys.

UNITED STATES PATENT OFFICE.

OSCAR B. GRANT, OF AUSTIN, MINNESOTA.

AUTOMATIC HOSE-COUPLER.

SPECIFICATION forming part of Letters Patent No. 391,789, dated October 30, 1888.

Application filed June 25, 1888. Serial No. 278,105. (No model.)

*To all whom it may concern:*

Be it known that I, OSCAR B. GRANT, a citizen of the United States, residing at Austin, Mower county, Minnesota, have invented certain new and useful Improvements in Automatic Hose-Couplers for Railway-Trains, of which the following is a specification.

My invention relates to couplings for all kinds of hose or pipes between the cars, whether passenger or freight cars; and the object of the invention is to provide means by which all such pipes or hose may be automatically joined or coupled at the same time that the cars are coupled, thus obviating the necessity of passing between the cars to make the hose or pipe connections, and by which also the hose or pipes are automatically uncoupled when the cars are uncoupled and parted.

By the application of this device to both passenger and freight cars of all classes mixed trains can be made up and the automatic hose-coupler will act the same as if all were passenger or all freight cars, provided the same number and kinds of lines of pipe are on each of the cars, or so far as the cars are equipped with the same lines of pipe, and in general, beside there being a saving of time, hand-coupling can be wholly done away with, and with it the dangers attendant upon the going between the cars to couple or uncouple the pipes or hose by hand.

In applying the device to locomotives and the different kinds of cars it is necessary to have a uniform location as regards height from track and distance from point of coupling of cars.

Figure 3:
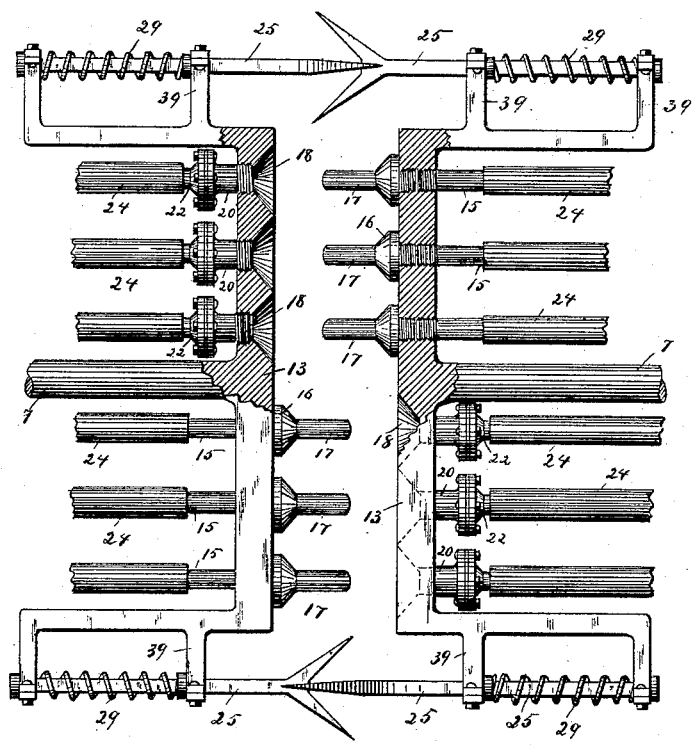
Figure 4:
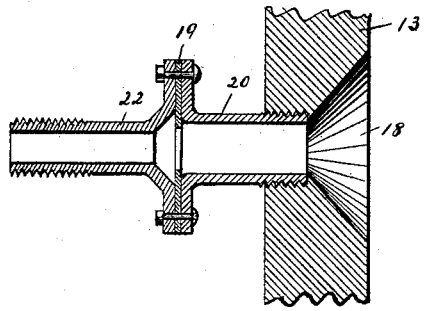
Figure 5:
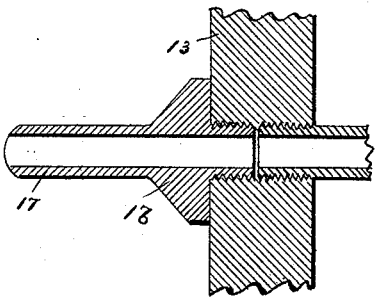

In the drawings forming part of this specification, Figure 1 is a plan view of the coupler in position, the two parts being coupled together and connection being established between the train-pipes, the upper part of frames and bodies of cars being cut away to show the connections. Fig. 2 is a front elevation of the coupler-head. Fig. 3 is a plan view of the two coupler-heads slightly separated to show the relative position of the parts. Figs. 4 and 5 are detail drawings.

In the drawings, 1 is a metal bar suspended upon the supports or arms 2 under the end of the car, either square or of other form not cylindrical to prevent its turning in its supports. Its forward end forms the socket part of a ball-and-socket joint, 3, one side of which, 5, is detachable to admit of the insertion of the ball of the joint. This ball is the rear end of the bar 7, which carries and is preferably made solid with the coupler-head or frame 13. To support the bar 7 with the coupler-heads and attachments level and in line with the main bar 1, I use the forked steel bars 21, which are rigidly fastened to 1 at 23, and are forked at 40, so as to constitute extensions or prongs, preferably four in number, which extend forward into sockets in the coupler-head. These bars 21 are sufficiently heavy to support the weight of the coupler, while having sufficient spring, in connection with the ball-and-socket joint, to allow the necessary lateral and vertical movement between the cars when in motion, or when brought together in coupling.

The coupler-head or frame 13 is fitted with the devices for making the automatic coupling. It is provided with twice the number of openings that there are lines of train-pipe to be connected.

The train-pipes are connected by the flexible hose 24 with the branched pipes 26, one branch of each of which is connected by flexible hose with the pipe entering an orifice in one side of the coupler-head, and the other with the corresponding orifice in the other side of the coupler-head.

The male parts of the coupler are preferably on one side of the frame and the female on the other side, or so arranged that they always retain the same relative position to each other. The male pipe or tube is made, preferably, in two parts, 15 and 17, each adapted to be screwed into the coupler-head, 15 being the part in the back of the head to which the train-pipe is flexibly connected, as described, 17 being screwed into the front of the coupler-head and projecting from it. This part 17 has a tapering or rounded point to admit of its readily entering its corresponding socket and fit closely therein, and the conical base 16, fitting squarely against the face of the frame or head 13, gives the tube greater strength. The principal object of having 17 a separate part is that in case it should become worn and unfit for use it can readily be replaced by a new part. The opposite or female part is of proper size to admit the male tube, and is provided with a funnel-shaped mouth, 18, so that in case the male tube does not come exactly opposite in coupling the mouth will direct its proper entrance, the conical base 16 being adapted to fit closely in the mouth 18. The two parts of the female tube—20, which is screwed into the coupler-head, and 22, with which connection is made with the train-pipe—have collars through which they are bolted together, part 22 being reduced in size, so that uniform flexible hose or tubes may be attached. A flexible ring, preferably rubber, 19, having a hole slightly smaller than the end of the tube 17, is fastened between the collars, so that the tube 17 when inserted will press against it and make the connection perfectly tight. The projections 31 above and below the center and flush with the face of the frame 13 relieve the tube 17 of strain caused by vertical motion of the cars.

The drawings show three lines of train-pipes and connections; but the coupler can be arranged for any number desired.

The coupler-heads are so adjusted that when coupling is made the faces of the heads meet each other a little before the car-coupling is completed, so that they are pressed back and their springs 9 brought into tension, thus providing for any slack in the car-coupling. On the sides of heads are the lugs 39, in which slide the forked guide-bars 25. These are provided with the springs 29, which hold the bars extended forward beyond the face of the coupler-head, the forks of the bar on the one side of every coupler being held in a vertical plane and that of the other in a horizontal plane, thus making them right and left, so that when the cars approach each other if the coupler-heads are out of line or position with each other, or if the cars meet on a curve, the guide-bars will meet first, the horizontal fork fitting into the opposite vertical fork, and thus the heads, with their corresponding parts, will be guided directly to each other and squarely face to face, the ball-and-socket joint and the spring-bars 21 allowing the necessary play, as described.

The springs 29 allow the guide-bars to be pressed back as the coupler-heads come together, and so remain until released by the uncoupling of the cars, when the springs cause the guide-bars to resume their normal position.

The guide-bars are made square or some other shape not cylindrical, so as to prevent them from turning in their bearings.

In the drawings the train-pipes are shown with stop-cocks 36, which are operated by crank-arms 37, attached to the rod 33, held in proper bearings and extending outside, or to a convenient point near the outside, of the car-body, and having handles 35, by which it may be turned and all the pipes opened or closed, as may be desired, the position of the handles 35 indicating whether the pipes are open or closed.

The operation of the automatic hose-coupler is as follows: As the cars to be coupled approach each other, the guide-bars 25 will first meet and fit together, so that their point of contact is in the fork of each. The couplers are thus properly directed together, and the male tubes enter the mouths of the female tubes and are guided into position. The coupler-heads meet and are crowded back on their springs until the cars are coupled, the parts being connected and held together, as above described. The handles of the rod 33 being turned, the pipes are opened and communication established through them between the cars. In uncoupling the operation is exactly reversed.

I claim as my invention—

1. In a railway-car having lines of pipes for conveying water, steam, gas, air, or other fluid from car to car through a train, the head 13, properly supported under the end of the car, having flexible connections with the pipes of the car and provided with male and female parts of couplings, and with guides adapted to engage corresponding guides upon a similar coupler on another car, whereby in the operation of coupling cars equipped with the heads the heads will meet each other and automatically connect the corresponding pipes of the different cars, and when the cars are uncoupled and parted the pipes will be automatically disconnected, substantially as described.

2. In an automatic car pipe or hose coupler, the combination of the head or frame 13, properly supported and connected with the train-pipes and having the bars 7 and 1, and the spring 9, with the joint 3, and the spring-bars 21, by means of which the frame or head is elastically and flexibly supported in position, and when coupled to its opposite head adjusted to the movement between the cars, substantially as described.

3. The combination, with a car pipe or hose coupler, of the forked guide-bars 25, carried and sliding in proper supports on either side of each coupler and fitted with the springs 29, adapted each to engage the opposite guide-bar of an approaching coupler, and thus guide the couplers squarely together, substantially as described.

4. In an automatic car pipe or hose coupler, the combination, with the head 13, suitably supported and fastened under the ends of the car, of the male pipes or tubes 17 in one side of the head, the female tubes or pipes 20 in the other side of the head, in number, form, and relative position adapted to receive the opposite parts of a coupler on another car when the cars are coupled together, the branched pipes 26, fitted with the flexible hose or pipe 24, by means of which each of the train-pipes on the car is connected with both a male and a corresponding female pipe in the frame-head, so that either end of a car equipped with the device can be coupled to either end of another car similarly equipped, and a continuous connection made of any pipes or series of pipes between the cars, substantially as described.

5. In an automatic car pipe or hose coupler, the combination, with the coupler-head 13, of the bar 7, the bar 1, having the spring 9, the ball-and-socket joint 3, flexibly uniting said bars 7 and 1, the spring-bars 21, the guide-bars 25, fitted with the springs 29, and sliding in suitable supports attached to or forming a part of the coupler-head, the male tubes 17, fixed in one side of the coupler-head, the female tube 20, fixed in the same relative position in the other side of the coupler-head and suitably connected with the train-pipes of the car, so adapted that the male and female parts of one coupler will engage with the female and male parts of an opposite coupler, substantially as described.

6. In an automatic car pipe or hose coupler, the combination, with the coupler-head 13, flexibly and elastically joined to and supported under or upon the car-body and fitted with suitable elastic guides to direct its course toward the opposite coupler, of tubes 17, projecting from the front of the head, the tubes 22, recessed in the head and fitted with the train pipes or hose, so that each line of pipe or hose is connected at each end with a tube, 17, and a tube, 22, and so adapted and adjusted that when two cars fitted with the hose-couplers are coupled together the corresponding pipes in both cars are automatically joined at two points, and when the cars are uncoupled the pipes are automatically disconnected, substantially as described.

OSCAR B. GRANT.

Witnesses:
J. M. OXLEY,
F. J. HOLMES.